No. 630,514. Patented Aug. 8, 1899.
E. MÜLLER.
SHAFT COUPLING.
(Application filed June 22, 1897.)
(No Model.) 3 Sheets—Sheet 1.

Witnesses.
Raymund Gloetzner
H. Mitchell

Inventor.
Emanuel Müller
by Max Georgii
Attorney.

THE NORRIS PETERS CO., PHOTO-LITHO., WASHINGTON, D. C.

No. 630,514. Patented Aug. 8, 1899.
E. MÜLLER.
SHAFT COUPLING.
(Application filed June 22, 1897.)
(No Model.) 3 Sheets—Sheet 2.

No. 630,514. Patented Aug. 8, 1899.
E. MÜLLER.
SHAFT COUPLING.
(Application filed June 22, 1897.)
(No Model.) 3 Sheets—Sheet 3.

Witnesses.
R. A. Gloetzner
N. Mitchell

Inventor.
Emanuel Müller
by Max Georgii
Attorney.

UNITED STATES PATENT OFFICE.

EMANUEL MÜLLER, OF LEIPSIC, GERMANY, ASSIGNOR TO HEINRICH HIRZEL, OF SAME PLACE.

SHAFT-COUPLING.

SPECIFICATION forming part of Letters Patent No. 630,514, dated August 8, 1899.

Application filed June 22, 1897. Serial No. 641,842. (No model.)

*To all whom it may concern:*

Be it known that I, EMANUEL MÜLLER, a citizen of Switzerland, residing at Leipsic-Plagwitz, Kingdom of Saxony, Germany, have invented a new and useful Improvement in Shaft-Couplings, of which the following is a full and exact specification.

My invention relates to improvements in couplings for shafts and the like.

The object of my invention is to provide a coupling which in proportion to the diameter of the shaft for which it is to be used will be much smaller than those couplings hitherto known to me, will have no projecting parts liable to cause accidents during the rotation of the shaft by catching in the garments of workmen, and which will securely couple the shafts to which it is applied, while at the same time readily permitting the uncoupling of said shafts.

With these objects in view my invention consists in the features, details of construction, and combination of parts which will first be described in connection with the accompanying drawings and then particularly pointed out in the claims.

Figure 1:
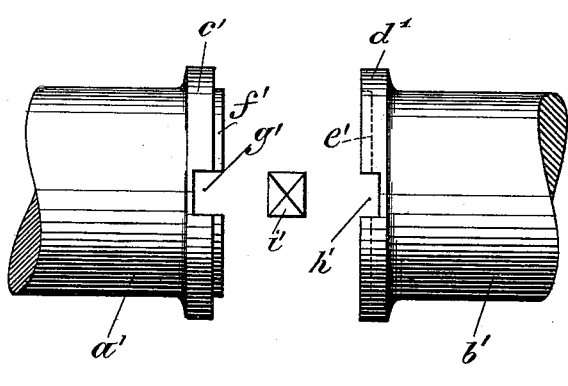
Figure 2:
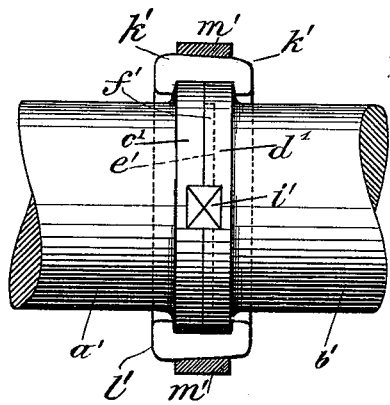
Figure 3:
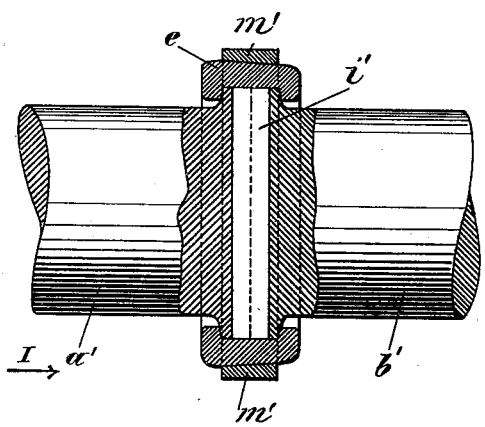
Figure 4:
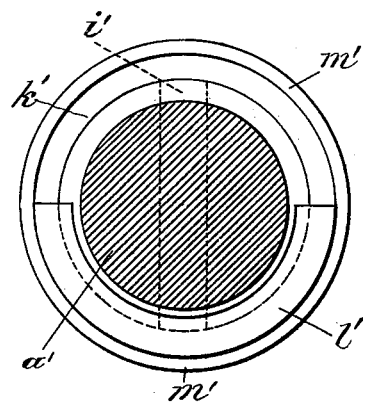
Figure 5:
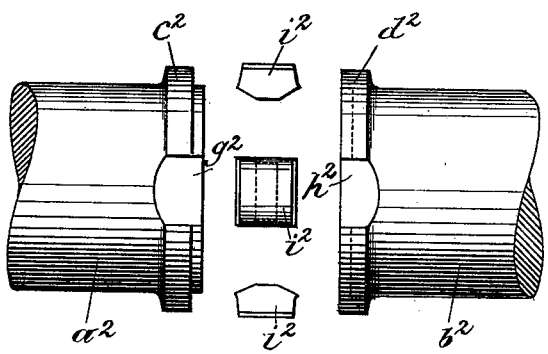
Figure 6:
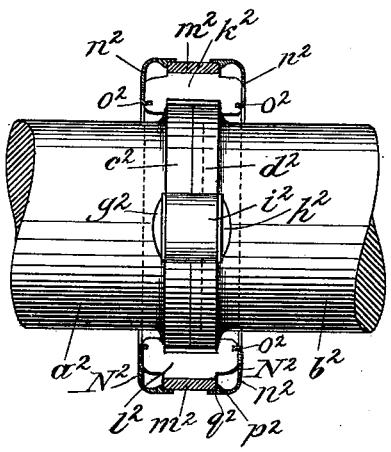
Figure 7:
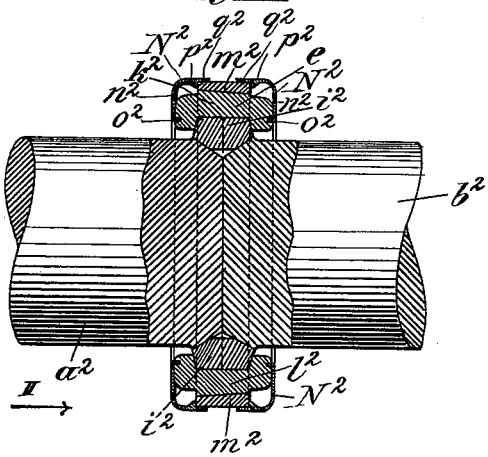
Figure 9:
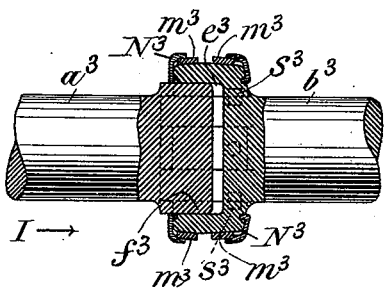
Figure 10:
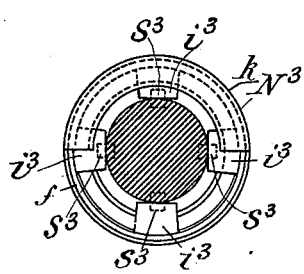
Figure 11:
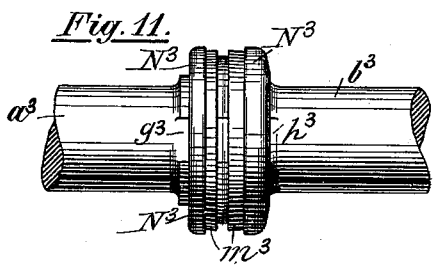
Figure 12:
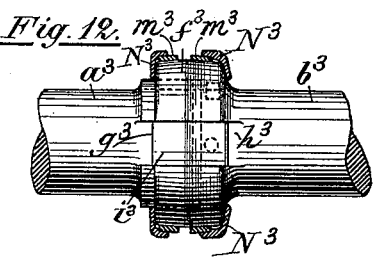
Figure 13:
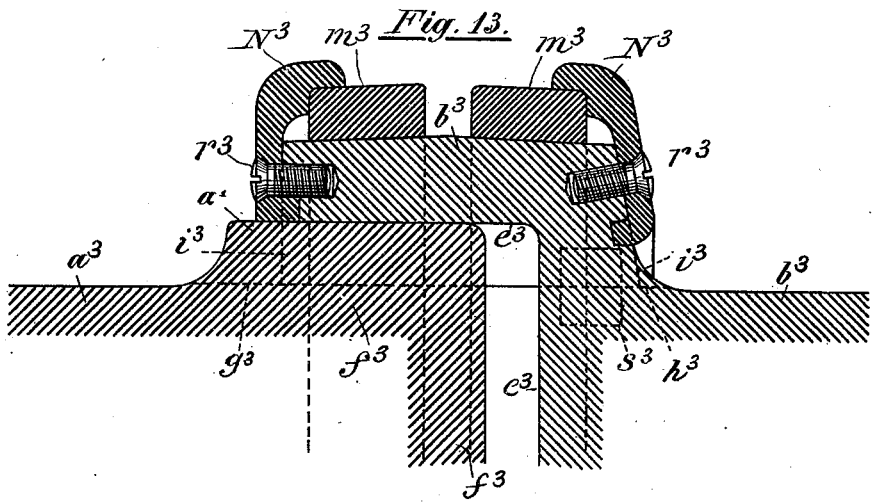

In the drawings, Figure 1 is an elevation of two shaft ends prepared in accordance with my invention and forming part of the coupling device, said shaft ends being shown apart with a key device $d$ between them. Fig. 2 is a view showing the two shaft ends in contact with the key in place and with a coupling-ring and a holding-ring in place, the latter rings being in section. Fig. 3 is a view similar to Fig. 2, the whole coupling being assumed to be rotated in its axis ninety degrees from the position shown in Fig. 2, a part of each shaft end being in section to show the key in place, the holding-ring also being in section. Fig. 4 is a transverse section through the shaft end $a$, showing one part of the coupling-ring removed, the other part in place, and the holding-ring in its normal position. Figs. 5 to 8 are views similar to Figs. 1 to 4, respectively, and illustrate another form of coupling embodying my invention. Fig. 9 is a sectional view of another form of coupling embodying my invention; Fig. 10, a transverse section of the same through one of the shaft ends, showing one part of the coupling-ring removed; Fig. 11, an elevation of the same; Fig. 12, an elevation, partly in section, of the said modification, one-half of each holding-ring being removed. Fig. 13 is an enlarged detail sectional view of the modification shown in Figs. 9 to 12.

Referring to the drawings, and particularly to the constructions shown in Figs. 1 to 4, inclusive, $a'$ and $b'$ are two shafts to be coupled. Each shaft end is provided with a flange $c'$ $d'$, respectively, one of the ends also being provided with a circular recess or shallow socket, as indicated by the dotted lines at $e'$ in Fig. 1, while the other end is provided with a corresponding projection $f'$, arranged to enter the socket $e'$ and to fit the same exactly, so that the end faces of the shafts $a'$ and $b'$ will come into close contact when the projection $f'$ is in its socket $e'$. Each shaft end is provided with a diametrically-arranged groove, as indicated at $g'$ $h'$, these grooves being in the nature of key-seats arranged to receive a key $i'$, as will be clear from Figs. 2 and 3. The two flanges $c'$ $d'$ when the shaft ends are in close contact are encircled by a coupling-ring formed of segmental sections $k'$ $l'$, said coupling-ring having an interior rabbet of such size as to receive the outer parts of the two flanges $c'$ $d'$, as shown in Fig. 2. The periphery of the said coupling-ring is made tapering or conical in order that a holding-ring $m'$, having a correspondingly-coned interior surface, may be driven tightly onto said coupling-ring formed by the segments $k'$ $l'$, thereby compressing the said segments and binding the flanges $c'$ $d'$, so as to hold the two end surfaces of the shafts in close contact with each other, the inner surface of the coupling-rings being also in close contact with the said flanges. In order to uncouple the device, the holding-ring $m'$ is driven off, which may readily be done with a few blows of a hammer, thus permitting the segments $k'$ $l'$ of the coupling-ring to be removed from the flanges $c'$ $d'$, after which the key $i'$ may be driven out, thus freeing the two shaft ends and permitting motion of one shaft with relation to the other shaft, if this be desired.

Figure 8:
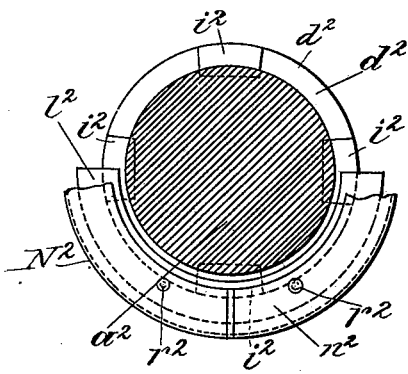

In Figs. 5 to 8, inclusive, I have shown another form of coupling embodying my invention. In this said form the shaft ends $a^2\ b^2$ instead of being provided with diametrical grooves or key-seats have notches, as shown at $g^2\ h^2$, Fig. 5, these notches being arranged to be brought into register with each other, whereupon a key $i^2$, in the nature of a block, may be inserted into the registering notches. In the construction shown in Figs. 5 to 8, inclusive, four of these key-blocks $i^2$ are employed; but it is obvious that more or less may be used, as circumstances require. This second construction also differs from that shown in Figs. 1 to 4, inclusive, in that the holding-ring $m^2$ is held against slipping off the coupling-ring $k^2\ l^2$ by means of retaining-rings $N^2$, each of which is provided with a radial portion $n^2$, having a circumferential flange $o^2$, entering a corresponding recess in the respective side of the coupling-ring, and with a circumferential portion $p^2$, having its free edge provided with an annular recess, as indicated at $q^2$, which receives the corresponding edge of the holding-ring $m^2$. The retaining-rings $N^2$ are held to the coupling-ring by screws $r^2$, as indicated in Fig. 8. In this construction to uncouple the shafts the screws $r^2$ are removed and the retaining-rings $N^2$ taken off, after which the holding-ring $m^2$ may be driven off and the segments $k^2\ l^2$ of the coupling-ring released and removed. Then the key-blocks $i^2$ may be loosened and taken out, whereupon the two shafts are free to move relative to each other.

In Figs. 9 to 13, inclusive, another form of device embodying my invention is illustrated, this form differing from those previously described in that one shaft end has a deep socket, as shown at $e^3$, while the other shaft end has its projection $f^3$ enlarged to fit into the said deep socket. Moreover, the periphery of the shaft end which has the socket is provided with two conical surfaces engaged by two holding-rings $m^3$, as will be clear from Fig. 13, which rings when driven up tightly from opposite directions cause the socketed shaft end to be compressed, thus firmly contacting with the projection $f^3$ of the other shaft end. The holding-rings $m^3$ are each held in place by a single retaining-ring $N^3$, held in place by screws $r^3$. In this construction the key devices $i^3$ (of which four are employed) are located in longitudinal key slots or grooves cut radially through the bell portion of the socketed shaft end, as indicated at $h^3$, and extending into the enlarged projection of the other shaft end, as shown at $g^3$. The keys $i^3$ are each provided on their inner faces with holes, into each of which enters the end of a stud $s^3$, the other ends of the respective studs fitting into corresponding holes in the socketed shaft end. In this construction the end surfaces of the two shafts $a^3\ b^3$ are separated by a slight interval, whereby a small amount of longitudinal movement of the shafts relative to each other is permitted to allow the shafts to accommodate themselves to temperature changes. The keys $i^3$ also permit this longitudinal movement of the shafts with relation to each other, while at the same time compelling them to rotate in unison. To uncouple this device, the screws $r^3$ are taken out and the retaining-rings $N^3$ moved along the respective shafts away from the holding-rings $m^3$, which may then be driven off in opposite directions, thus freeings the keys $i^3$, which can be lifted out of their respective seats, the studs $s^3$ being also capable of removal, if desired, since they are held in the holes in the shaft end by friction only. In this condition the shafts may rotate separately, if desired.

It will be seen that by my construction the coupling is comparatively small, that pulleys may be mounted on the shafts close to the shaft ends, and that owing to the great amount of frictional surface in contact the key devices are relieved from a part of the strain due to transmission of power from one shaft to the other.

Having thus fully described my invention, what I claim as new, and desire to secure by Letters Patent of the United States, is—

1. In a shaft-coupling, the combination with two shafts placed end to end, said ends being enlarged and provided with frictional surfaces in contact with each other, each end also having a recess, the said recesses being in register with each other, of a key arranged partly in each recess, and a ring arranged to hold the key in place and to press the frictional surfaces of the shaft ends in close contact with each other.

2. In a shaft-coupling, the combination with two shafts placed end to end, one shaft having its end provided with a socket and the other with a projection arranged to enter said socket, each shaft end having a recess which recesses register with each other, of a key located partly in each recess, and means for holding the key in place and compressing the surfaces of the projection of one shaft end into close contact with the corresponding surfaces of the socket on the other shaft end.

3. In a shaft-coupling, the combination with two shafts placed end to end and having flanges, of a coupling-ring having an interior recess arranged to receive the flanges and provided with a tapered portion, and a holding-ring fitting tightly over said tapered portion.

4. In a shaft-coupling, the combination with two shafts placed end to end and having flanges, of a segmental coupling-ring having an interior recess arranged to receive the flanges and provided with a tapered portion, and a holding-ring fitting over said tapered portion.

5. In a shaft-coupling, the combination with two shafts having flanges at the adjacent ends, each end having a recess, which recesses register to form a key-seat, of a key located in said seat, a coupling-ring encircling the flanges and the key and provided with a tapered portion, a holding-ring on said tapered portion, and means for retaining the holding-ring in place.

In testimony whereof I have signed my name to this specification in the presence of two subscribing witnesses.

EMANUEL MÜLLER.

Witnesses:
RUDOLPH FRICKE,
OTTO DOEDERLEIN.